April 1, 1924. Re. 15,805

E. J. GUAY

ACTUATING DEVICE AND METHOD OF MAKING THE SAME

Original Filed Nov. 4, 1919

Inventor:
Emile J. Guay,
by Alexander S. Lunt
His Attorney.

Reissued Apr. 1, 1924. Re. 15,805

UNITED STATES PATENT OFFICE.

EMILE J. GUAY, OF SWAMPSCOTT, MASSACHUSETTS, ASSIGNOR TO GENERAL ELECTRIC COMPANY, A CORPORATION OF NEW YORK.

ACTUATING DEVICE AND METHOD OF MAKING THE SAME.

Original No. 1,463,015, dated July 24, 1923, Serial No. 335,775, filed November 4, 1919. Application for reissue filed January 29, 1924. Serial No. 689,347.

*To all whom it may concern:*

Be it known that I, EMILE J. GUAY, a citizen of the United States, residing at Swampscott, county of Essex, State of Massachusetts, have invented certain new and useful Improvements in Actuating Devices and Methods of Making the Same, of which the following is a specification.

As is generally appreciated great efforts are being made at the present time to reduce unnecessary noises, and especially is this true as to the present type of automobile engines. Such an engine has a good many valves, at least two for every cylinder, and these valves are actuated by cams either directly through push rods or through push rods and levers. A certain amount of clearance must always be left between the actuating part and the valve stem to ensure the proper seating of the valve when the cam moves from its active to its inactive position. This clearance, although small, gives rise to considerable noise when the actuating part is rapidly moved into contact with the valve stem. It is in the nature of a hammer blow delivered at high speed to a part which has considerable inertia. When the parts are properly set or adjusted the noise is not particularly objectionable in many cases, but it becomes so as soon as parts wear or get out of adjustment which they do rather rapidly.

I have invented or discovered a means whereby this noise can be prevented even after the engine or other mechanism has been in operation for a long time. I am also able to use larger clearances than are customary in the valve mechanism of engines without causing objectionable noise, which is advantageous because it ensures the proper seating of the valves at all times.

For a consideration of what I believe to be novel and my invention, attention is directed to the accompanying description and claims appended thereto.

Figure 1:
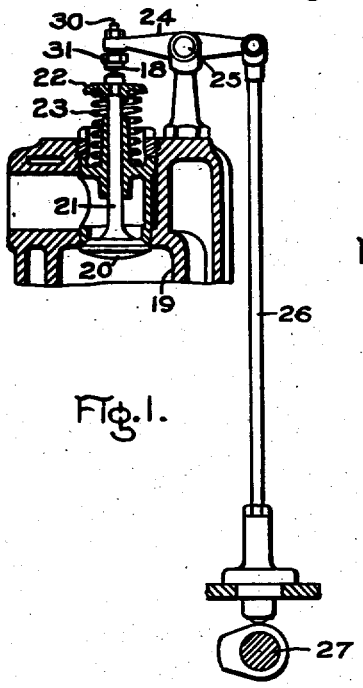
Figure 2:
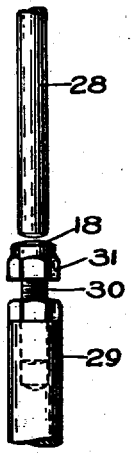
Figure 7:
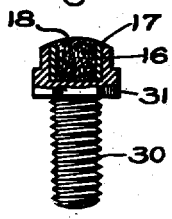
Figure 3:
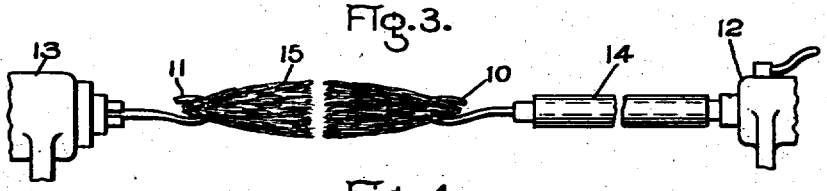
Figure 4:
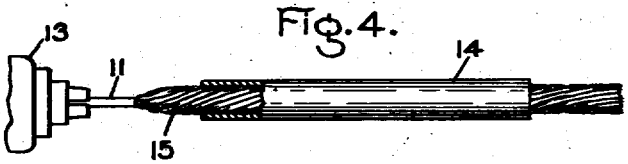
Figure 5:
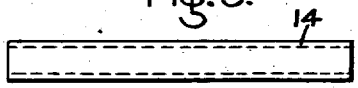
Figure 6:
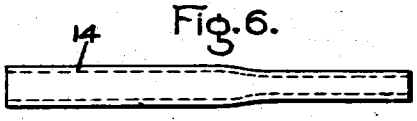

In the attached drawing, which is illustrative of my invention, Fig. 1 is a partial section of a gasolene engine; Fig. 2 is a view in elevation of an actuating mechanism such as is employed in gasolene engines of the L-head type and which may be taken as illustrating the general application of my invention; Fig. 3 is a view of the means employed in carrying out one of the steps in the process of manufacture; Fig. 4 illustrates a later step in the process; Fig. 5 shows a shell or tubular container after it has been filled with spinnable textile fibers; Fig. 6 shows the shell after it has been partially swaged to increase the compression of the said fibers, and Fig. 7 is a sectional view of a finished device illustrating one form of my invention.

In carrying out my invention I employ a body of highly compressed spinable textile fibers which is surrounded by a metallic shell, the wall of said shell holding the material in its compressed state by sidewise pressure, which shell is afterwards mounted in a suitable holder. A variety of textile fibers are available for the purpose. Of these my experience shows that asbestos of the grade commonly employed in weaving fire curtains for theatres is entirely satisfactory. I may also use asbestos of a somewhat inferior grade containing a certain limited amount of cotton or equivalent material provided the fibers are of reasonable length. I have also found ordinary cotton used in weaving cloth and garments entirely satisfactory, since both the asbestos and the cotton are characterized by the presence of relatively long spinnable fibers. Such fibers can be highly compressed without injury and in addition to their sound-deadening property are not injured by oil either hot or cold. They will successfully withstand high temperatures and the material when properly compressed can be machined by ordinary methods much the same as iron and steel.

It is essential to the successful operation of my invention that the fibers be highly compressed and, if the best results are to be obtained, the fibers should extend lengthwise of the shell and present their ends to the cooperating metallic part which is to be actuated. To avoid the sound incident to the contacting of two metallic surfaces care should be exercised to see that of the actual meeting surfaces at least one is composed wholly of highly compressed spinnable textile fibers. Since the material is fined in a metallic shell, preferably seamless steel tubing, this can be readily done by making the wall of the shell slightly shorter than the axial length of the material at the center. The simplest and best way to carry out the invention is to insert the fibers in an open-ended tube and subject them to a preliminary compression, the final compression being attained by reducing the size of the tube. In other words, the compression pressure is exerted in a direction perpendicular to the axis of the tube and to the general direction of the fibers.

One of the chief problems in making my improved construction is first to get the fibrous material into the shell or tube and second to compress it. A simple and satisfactory way to do this is illustrated in Fig. 3 in which two hooks or frames 10 and 11 are provided. The hook 10 is made fast to any suitable device such as the tail stock 12 of a lathe and the hook 11 to some part as the rotating head 13. The tube 14 is first slipped back over the hook 10 so as to expose it. Spinable textile fibers, such as asbestos, cotton or the like in the form of sliver 15, are then wound over the hooks until a sufficient quantity is provided. The head carrying the hook 11 is then rotated which twists the body thus formed and at the same time gives it considerable compression as shown in Fig. 4. The tube 14 is then slipped endwise over said body to hold it in its compressed state with the fibers extending longitudinally of the tube. After the tube is in place the tension is released by rotating the hook 11 backwardly and the material is cut between the ends of the tube and the hooks. It is not practical to get the necessary heavy compression in this manner so the tube with its filler is either put through successive dies of decreasing size or it is swaged. The swaging process is preferable because it is less liable to break the fibers and is also less expensive. The swaging can be done in an ordinary swaging machine and should be by successive operations so as to reduce the size of the shell rather gradually and thereby avoid undue strains on the fibers which would tend to break them.

A reduction in diameter of the tube of about one-eighth to five-thirty seconds of an inch for each operation of which at least two are generally required will be found to be satisfactory. This swaging operation has the effect of highly compressing the fibrous material by exerting heavy-sidewise pressure thereon, the ends being left free. As the swaging takes place there is a certain small amount of relative movement between the fibrous material and the tube. As a matter of fact the tube slides over the material to a certain extent and when the operation is finished the ends of the tube project somewhat beyond the fibers. The swaging operations somewhat elongates the tube as well as reduces its diameter. In addition the walls of the tube are made somewhat thicker due to the reduction of diameter. At this stage in the process the fibrous material is very highly compressed and is therefore very dense and hard. Owing, however, to the nature of the material it has a certain limited amount of resiliency which is useful in absorbing shocks as well is to eliminate noise.

After the tube has been properly swaged it is cut into short lengths as indicated at 16 in Fig. 7. The ends of the tube section is beveled back as at 17 and the fibrous material slightly crowned as at 18 so that the center will be the highest point.

My invention is capable of wide application where it is desired to decrease noise and the shock of two meeting surfaces, particularly where one of the parts has considerable inertia and has to be quickly started from a position of rest. A particularly useful field for my invention is found in the various types of automobile engines where the cams have to open the valves with great rapidity.

In Fig. 1 is shown an engine of the valve in the head type in which 19 indicates a portion of a cylinder and 20 a valve. The valve is located in a suitable cage with its stem 21 rising vertically. On the stem is a collar 22 for confining the closing spring 23 under pressure. 24 indicates a rocker arm which is pivoted on the shaft 25. To the outer end of the arm is attached a push rod 26, the lower end of said rod having a roller which rides on the valve actuating cam 27 in the usual manner. Carried by one end of the rocker arm and in alignment with the valve stem is one of my improved devices constructed as shown in Fig. 7 and provided with a suitable lock-nut. As is evident my improved device can be mounted on the valve stem or on the rocker arm but the preferred arrangement is to mount it in the arm. Another way to do this is shown in Fig. 2 in which 28 indicates a part to be actuated and 29 the actuating part. Between the two is a member constructed as shown in Fig. 7 in which 30 represents a screw having a threaded shank and a hexagon head 31 which is recessed or socketed to receive the short length of tube with its filler of fibrous material, the whole forming a holder capable of being mounted for use in a variety of ways and for a variety of purposes. The portion of the head adjacent the upper end of the tube is rolled over said tube so as to form a good securing means. It will be observed that the fibers are held in compression by the wall of the tube and that the bottom of the tube and the filler rest firmly on the bottom wall of the socket, the filler at the top being free and slightly rounded or crowned so as to prevent a metal-to-metal contact when the parts are actuated. On account of being threaded the screw can readily be adjusted up and down to give the necessary clearance between the cooperating parts, a check-nut being employed to lock the parts in adjusted position. The usual clearance may be employed between said parts, but owing to the use of spinnable textile fibers which prevent noise a greater clearance can be provided than is ordinarily permissible with metal-to-metal parts and thus the proper seating of the valves is assured.

It is preferable to make up the material in pieces of considerable length since a considerable saving of labor and material is thereby effected but each device may be made separately if for any reason it is necessary or desirable.

An automobile engine fitted with my improved construction has been exhaustively tested with the result that the noise due to the valve actuating parts is eliminated. I have also found that the wear on the contacting surfaces is reduced to a negligible amount. The wear on the textile fibers when properly compressed is about the same as that of steel.

What I claim as new and desire to secure by Letters Patent of the United States, is,—

1. A device of the character described, comprising a body of spinnable textile fibers and a shell which surrounds said fibers and holds them under compression, said shell being open at one end whereby the ends of the compressed fibres are exposed to present a working surface.

2. A device of the character described, comprising a body of spinnable textile fibers and a metallic shell which surrounds the fibers and holds them in a highly compressed state, said fibers extending lengthwise of the shell and presenting at one end of it a hard working surface.

3. A device of the character described, comprising a body of textile fibers and a metallic tube surrounding said body and having an open end, said tube exerting heavy pressure on said body in a direction perpendicular to its axis.

4. A device of the character described, comprising a body of spinnable textile fibers and a metallic shell which surrounds the body circumferentially and highly compresses the fibers, the fibres at one end of the shell presenting a hard working surface.

5. A device of the character described, comprising an open-ended metallic shell containing a body of fibrous material which is maintained in a high state of compression by the walls of said shell, said material projecting slightly beyond the shell at one end to provide a working surface.

6. In combination, a part which is to be moved, a second part for moving the first, and means interposed between said parts comprising a shell containing a body of compressed fibrous material, the action of one part on the other taking place through said material.

7. In combination, a part which is to be moved, a second part for moving the first, and means interposed between said parts and through which one acts on the other comprising a shell containing a body of compressed fibers in which said fibers extend lengthwise of the shell and present their ends to one of the parts.

8. A device of the character described, comprising a shell which surrounds a body of fibers and holds them under compression by exerting sidewise pressure thereon, and a holder for said shell.

9. A device of the character described, comprising a tube which is filled with spinnable textile fibers extending lengthwise thereof and held under heavy compression by the wall of the tube, and a holder for said tube.

10. A device of the character described, comprising a tube which is filled with spinnable fibers extending lengthwise thereof and held under heavy compression by the wall of the tube, and a holder containing a socket in which the tube and its filler are seated, said filler extending slightly beyond one end of the tube.

11. The method of making devices of the character described which comprises filling an elongated shell with spinnable textile fibers and compressing the same by reducing the size of the shell.

12. The method of making devices of the character described which comprises filling a shell with spinnable textile fibers and subjecting the same to a preliminary compression, and increasing the compression to a high degree by reducing the size of the shell.

13. The method of making devices of the character described which comprises filling a tube with fibers arranged lengthwise and in a somewhat compressed state, and increasing the compression by reducing the size of the tube by successive steps.

14. The method of making devices of the character described which comprises filling a tubular shell with spinnable textile fibers and subjecting the same to compression by reducing the size of the shell by successive swaging operations.

15. The method of making devices of the character described which comprises winding spinnable fibers on a frame, inserting the material so wound in a shell and then reducing the cross-sectional area of the shell until said fibers are highly compressed.

16. The method of making devices of the character described which comprises winding spinnable fibers on a frame, twisting the frames relatively to each other to partially compress the fibers, inserting the material so compressed in a tube, and then reducing the size of the tube by swaging.

17. The method of making devices of the character described which comprises winding spinnable fibers on a frame, said fibers extending lengthwise, partially compressing the fibers, inserting the body thus formed lengthwise in a tube, subjecting the fibers to heavy sidewise pressure by reducing the size of the tube, and dressing off the ends of the tube and the body of fiber, leaving the fibers at one end projecting slightly beyond the tube.

18. The method of making devices of the character described which comprises forming a body of textile fibers, said fibers being arranged lengthwise and under some compression, inserting the body thus formed in an open-ended seamless tube, subjecting the outside of the tube to transverse pressure to reduce its diameter, increase the thickness of its wall and highly compress said body.

19. A device of the character described comprising a holding member having a socket with a body located therein which comprises highly compressed textile fibers arranged lengthwise of the body with the fibers at one end of the body exposed to present a working surface.

20. A device of the character described comprising a metallic holding member having a socket with a body enclosed in the socket except at one end and comprising highly compressed textile fibers in which body the fibers extend lengthwise, the fibers at the inner end of the body being supported by the bottom wall of the socket and those at the outer end being exposed to form a working surface.

21. A device of the character described comprising a metallic holding member having a socket, a body of spinnable textile fibers in which body the fibers extend lengthwise, the fibers at the inner end of the body being supported by the bottom wall of the socket and those at the outer end being exposed to form a working surface, and means for holding the fibers in a highly compressed state.

22. A device of the character described comprising a socketed member, the outer end of which forms a securing means, a body enclosed in the socket except at one end and comprising highly compressed spinnable textile fibers in which body the fibers extend lengthwise, the fibers at the inner end of the body being supported by the bottom wall of the socket and those at the outer end being exposed to form a working surface, the said body being held between the securing means at the outer end of the socket and the bottom wall thereof.

In witness whereof, I have hereunto set my hand this 21st day of January, 1924.

EMILE J. GUAY.